United States Patent [19]
Steere et al.

[11] Patent Number: 5,403,482
[45] Date of Patent: Apr. 4, 1995

[54] SELF-SUPPORTING, PLEATED, SPIRALLY WOUND FILTER AND THE CORRESPONDING PROCESS OF MAKING

[75] Inventors: William C. Steere, Grass Lake; Eric Sklar, Northville, both of Mich.

[73] Assignee: Gelman Sciences Inc., Ann Arbor, Mich.

[21] Appl. No.: 133,999

[22] Filed: Oct. 12, 1993

[51] Int. Cl.⁶ .................. B01D 27/00; B01D 29/07
[52] U.S. Cl. .................. 210/489; 210/493.4; 210/500.38; 210/500.41; 210/500.27; 210/500.36; 156/222; 493/941; 264/DIG. 48
[58] Field of Search ............ 210/493.1, 493.4, 500.21, 210/500.41, 488, 489, 500.38, 500.27, 500.36; 156/218, 221, 222, 226, 227; 493/451, 941; 96/4; 264/DIG. 48

[56] References Cited
U.S. PATENT DOCUMENTS

| | | | |
|---|---|---|---|
| 1,669,461 | 5/1928 | Gamble | 210/493.4 |
| 2,322,548 | 6/1943 | Sigmund | 183/70 |
| 2,372,545 | 3/1945 | Breedlove | 210/493.4 |
| 3,042,571 | 7/1962 | Jackson | 156/191 |
| 3,880,755 | 4/1975 | Thomas et al. | 210/91 |
| 4,206,050 | 6/1980 | Walch et al. | |
| 4,500,426 | 2/1985 | Ishii et al. | 210/321.3 |
| 4,765,893 | 8/1988 | Kohlheb | 210/315 |
| 4,839,037 | 6/1989 | Bertelsen et al. | 210/97 |
| 4,855,058 | 8/1989 | Holland et al. | 210/652 |
| 4,872,990 | 10/1989 | Van Wijk | 210/644 |
| 5,028,329 | 7/1991 | Drioli et al. | 210/490 |
| 5,071,555 | 12/1991 | Enbom | 493/941 |
| 5,096,584 | 3/1992 | Reddy et al. | 210/321.74 |
| 5,096,591 | 3/1992 | Benn | 210/651 |
| 5,114,582 | 5/1992 | Sandstrom et al. | 210/321.74 |
| 5,120,296 | 6/1992 | Yamaguchi et al. | 493/941 |
| 5,147,541 | 9/1992 | McDermott, Jr. et al. | 210/321.74 |
| 5,174,896 | 12/1992 | Harms, II | 493/941 |
| 5,204,002 | 4/1993 | Belfort et al. | 210/634 |

Primary Examiner—Robert A. Dawson
Assistant Examiner—Robert James Popovics
Attorney, Agent, or Firm—Gifford, Krass, Groh, Sprinkle, Patmore, Anderson & Citkowski

[57] ABSTRACT

A coreless filter comprises a pleated, spirally wound loop of material disposed in a housing. The loop includes a layer of filter material, such as a membrane filter, interposed between two support layers.

20 Claims, 2 Drawing Sheets

SELF-SUPPORTING, PLEATED, SPIRALLY WOUND FILTER AND THE CORRESPONDING PROCESS OF MAKING

FIELD OF THE INVENTION

This invention relates generally to filters. More specifically, the invention relates to a single pass filter device which is self supporting and coreless.

BACKGROUND OF THE INVENTION

Filtering processes are widely used to remove a variety of contaminants from a gaseous or liquid fluid stream. In a filtering process, the fluid is passed, either singly or repeatedly, through a filter medium; therefore, filter throughput is effectively limited by the surface area of the medium, and high capacity filters include large area bodies of filter medium. In order to minimize the size of filter assemblies, a variety of filter configurations have been developed. The choice of configuration will depend upon the nature of the filter medium itself as well as the process requirements of the filtration, for example, volume being filtered, pressure drop, the nature of the contaminants and so forth.

One particular type of filter configuration includes a spirally wound body of filter medium disposed so that the fluid stream will either pass axially or radially therethrough. Another type of configuration comprises a pleated medium. One specific configuration of pleated medium comprises a relatively planar medium, formed into a cylinder and pleated longitudinally. In some instances, the pleats are spirally wrapped about the axis of the cylinder. Such spirally wrapped, pleated configurations are occasionally referred to as semi-spirally wound filters. U.S. Pat. Nos. 3,042,571 and 2,327,548 disclose various configurations of pleated, and spirally wound filters.

One particularly important class of filters include porous membrane filter elements. These membranes are typically fabricated from polymeric materials and include pores having precisely controlled sizes ranging from macroporous through microporous to ultraporous. Such membranes are typically fairly thin and fragile, and filters including porous membranes usually incorporate a support element. U.S. Pat. No. 4,500,426 discloses a number of configurations of filters including porous membranes, and FIGS. 13–18 disclose a pleated, spirally wound membrane filter. As shown therein, the membrane is folded about a spacer and wound about a central core. The central core is necessary to provide support and stability to the filter element so as to prevent damage to the relatively fragile membrane. It is desirable to eliminate the central core for a number of reasons. The core limits the active area of the filter to some degree, and the use of a core increases the material cost of the filter element as well as the time and labor required for its manufacture; however, prior art membrane filters have not had sufficient integrity to permit their manufacture without a central support core.

The present invention provides a unique configuration of pleated, spirally wound filter which incorporates a porous membrane as the active filter element thereof. The filter of the present invention is a self-supporting, coreless structure. It is easy to fabricate and highly efficient in both its use of materials and its operation. These and other advantages of the present invention will be readily apparent from the drawings, discussion and description which follow.

BRIEF DESCRIPTION OF THE INVENTION

There is disclosed herein a coreless filter. The filter includes a generally cylindrical filter element which is comprised of: a first elongated strip of a first support material which has its ends joined together to form a first support loop; a second elongated strip of a second support material having its ends joined together to form a second support loop concentric With the first support loop; and, an elongated strip of filter material which has its ends joined together to form a filter loop. The filter loop is concentric with, and interposed between, the first and second support loops. The loops comprising the filter element are configured into a pleated, spirally wound cylindrical body which includes a plurality of inward pleats and a plurality of outward pleats in an alternating relationship. The inward pleats are directed toward a central axis of the filter element and their apices are disposed in an abutting relationship so as to form a column which defines a central passageway therethrough. The pleats are wrapped about the central axis so that the apices of the outward pleats are tangentially disposed on an exterior surface of the cylindrical filter element. The filter further includes a housing which encloses the filter element. The housing has a first fluid flow conduit in communication with the central passageway and a second fluid flow conduit in communication with the exterior surface of the filter element. In use, a fluid introduced into one of the conduits passes through the support material and filter material and exits through the other conduit.

The filter material includes a porous membrane, preferably a hydrophilic membrane. The pore size of the membrane may range from macroporous to ultraporous, and preferably includes pores of up to 5,000 angstrom in size. The filter material may comprise a single layer membrane or a multi-layered structure. The support material is a macroporous material and may include woven and non-woven structures as well as extruded porous structures. Typically the area of the filter medium is no more than 1,000 square cm., and most preferably approximately 250 square cm.

The present invention also includes a method for the fabrication of the filter wherein a cylindrical loop of material comprised of a filter material sandwiched between layers of support material is pleated and spirally wound so as to provide the filter element which is subsequently disposed in a housing.

DETAILED DESCRIPTION OF THE INVENTION

Figure 1:
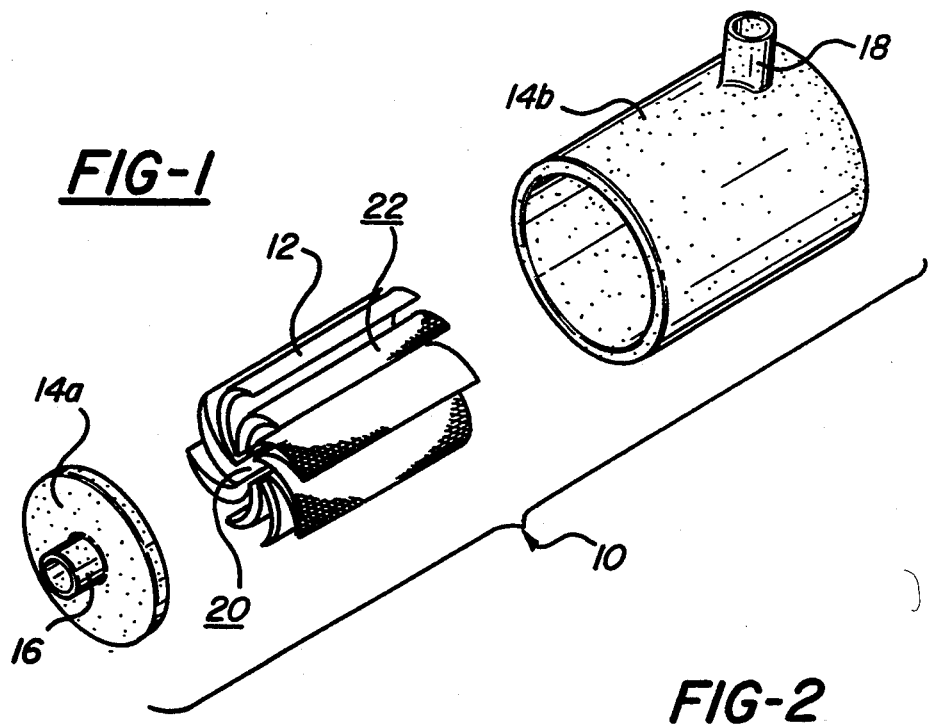
FIG. 1 is an exploded, perspective view of one embodiment of filter structured in accord with the present invention.

Referring now to FIG. 1, there is shown an exploded, perspective view of one embodiment of filter 10 structured in accord with the present invention. The filter 10 includes a generally cylindrical filter element 12, as will be described in greater detail hereinbelow, together with a housing which, in this embodiment is comprised of an end cap 14a and a main housing 14b. The end cap 14a includes a fluid conduit 16 which passes therethrough; and the main housing 14b includes another conduit 18 in communication with the interior thereof.

When the filter 10 is assembled, the filter element 12 is fitted into the main housing 14b and sealed therein by the end cap 14a. Sealing may be accomplished by the use of an adhesive, by thermal bonding, or by any other method which will affix the end cap 14a to the main body 14b of the housing. The end cap 14a is sealed to the filter element 12 so that the conduit 16 associated therewith communicates directly with a central passageway 20 of the filter element 12. In order to assure a tight seal, it is generally preferable that the face of the end cap 14a which contacts the filter element 12 is sealed thereto with a fluid-tight material so that any fluid passing through the conduit 16 and into the central passageway 20 will be constrained to travel through the element 12 to the exterior thereof. The conduit 18 is in fluid communication with the interior of the main housing 14b; and accordingly, is also in fluid communication with the exterior surface 22 of the filter element. It will thus be seen that a fluid introduced into one of the conduits 16 or 18 will be constrained to travel through the filter element 12 and to exit through the other conduit 18 or 16.

The filter element of the present invention is novel insofar as it is a self-supporting structure having sufficient rigidity and integrity that the use of a core element, as was standard in the prior art, is not needed. The filter element basically comprises a pleated, spirally wound member fabricated from a layered structure which includes a body of filter material interposed between two supporting layers.

Figure 2:
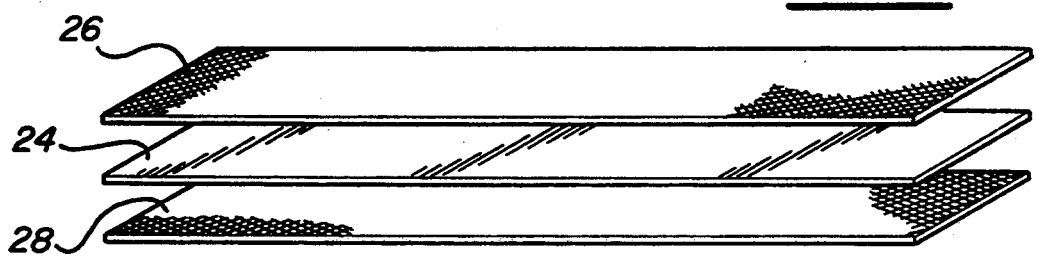
FIG. 2 is an exploded, perspective view of two strips of support material and an interposed body of filter material.
Figure 3:
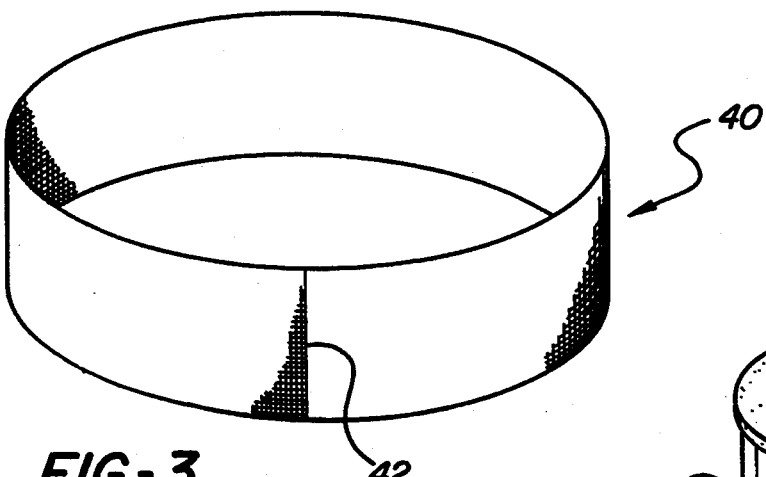
FIG. 3 is a perspective view of a loop of material at one stage in the manufacture of the filter element of the present invention.

FIGS. 2-5 depict various stages in the fabrication of the filter element of the present invention. Referring now to FIG. 2, there is shown a body of filter material 24 sandwiched between a layer of a first support material 26 and a layer of a second support material 28. In this figure, the layers 24-28 are shown in a spaced-apart, exploded relationship; although, it is to be understood that in the practice of the present invention the layers are in a generally superposed, contacting relationship. The layers of support material 26 and 28 are open in cross section, that is to say they are sufficiently porous to permit the ready passage of fluid therethrough, it being understood that in the context of the present invention, fluid is meant to define any liquid or gaseous medium, which may or may not include solid particles entrained therein. The support material should be resistant to degradation by any fluids which the filter will encounter. The material should have sufficient mechanical strength to permit processing and to provide a stable structure to the filter element. The support material should be non-compressible, or only slightly compressible over the anticipated pressure range in which the filter operates. A variety of materials meet the foregoing criteria. In general, the support material is preferably a woven or non-woven fabric. Organic polymers comprise one particularly preferred support material since they are relatively rigid and inert, and may be fabricated into a variety of structure having open cross sections. Polypropylene, nylon, polyester, polyamide and fluoropolymers are some materials having particular advantage in the practice of the invention. In some instances, porous paper may be employed as a support material. Another preferred support material comprises a molded or extruded screen or mesh of polymeric material and FIG. 6 depicts a body of support material 30 comprised of a sheet of polymer 32 having a plurality of openings defined therein.

The filter material 24, which is disposed between, and supported by the layers of support material 26 and 28, may comprise any one of a number of relatively thin, flexible media, including cloth, filter paper and the like; although, it has been found that the configuration of the present invention has particular advantage in connection with porous membrane filters. As mentioned hereinabove, these materials are typically thin and relatively fragile and the dual supported structure of the present invention assures a high degree of integrity to the filter material 24. One particularly preferred group of membranes comprises hydrophilic membranes; and, such membranes may be fabricated from a variety of polymers including polyethersulfone, polysulfone, fluoropolymers such as polytetrafluoroethylene, polypropylene, cellulose acetate and the like. As is known in the art, porous membranes may be prepared from these materials by techniques which involve precipitating layers from a solution in a manner which provides a controlled porosity to the resultant product. In general, the pore size of membranes of this type may be varied over a range extending from macroporous to ultraporous. The present invention has found particular utility for the preparation of filters from material having a porosity of less than 0.5 microns. A typical porosity range of filters of the present invention is approximately 0.1–0.5 microns, although it is to be understood that the present invention presents no impediment to the use of various membranes having larger or smaller pore sizes.

While FIG. 2 illustrates the filter material 24 as being a single layer, it is to be understood that, in some embodiments, the filter material may comprise a multi-layered structure. Referring now to FIG. 6, there is shown a body of filter material 24 which is configured as three separate layers 34, 36 and 38, it being understood that a larger or smaller number of layers may be similarly employed. In particular embodiments, all of the layers of the multi-layered filter material may comprise porous filter media. For example, in some embodiment it may be desirable to provide a series of stacked layers of sequentially decreasing pore sizes. For example, in the structure shown in FIG. 6, the topmost layer 38 may be a relatively wide pored material, the layer 36 a narrower pored material, and the layer 34 a fine pored material. In this manner, the large pored layers act as a prefilter which limits clogging of the final pored layers by large particles. In some instances, the porosity of all of the layers may be the same. In other instances, some of the layers of the multi-layered structure may be a porous membrane material whereas others may comprise further supporting, separating or protective layers. For example, in the illustration of FIG. 6, layers 38 and 34 may comprise a membrane material and layer 36 a spacer or support layer. Obviously, the reverse structure is also contemplated within the scope of the present invention. Therefore, it will be appreciated that in the context of this disclosure, the filter material may include a variety of structural configurations.

As illustrated in FIG. 2, the layers of support material 26 and 28, and the layer of filter material 24 are shown as generally elongated strips of material, and it will be noted that they are generally coextensive. In a subsequent step, the layers are formed into a loop, as shown at 40 in FIG. 3. The loop 40 of FIG. 3 comprises a loop of the first support material, a loop of the second support material and a loop of the filter material disposed in a generally superposed and concentric relationship. The loop 40 may be formed by joining the ends of the strips of support and filter material together, either separately, or in a concerted process. It is most preferred, for general economy of production, to provide a strip consisting of the three stacked layers and to simply join all of the ends together along a seam 42 in a single step. The ends of the strips may be Joined by the use of adhesives, by mechanical processes such as stitching, stapling and the like. In those instances where the various layers are thermoplastic layers they may be advantageously joined by a thermal welding process. In some other instances, solvent bonding may be employed.

Figure 4:
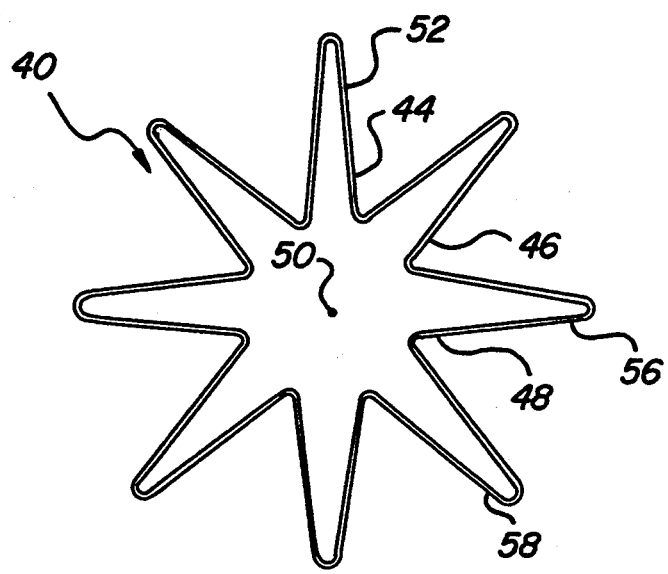
FIG. 4 is a top plan view of a pleated loop of material at another stage in its processing.

In a subsequent processing step as illustrated in FIG. 4, the loop 40 is formed into a pleated structure. As illustrated, the loop includes a plurality of inward pleats, as for example pleats 44, 46 and 48. The inward pleats are directed toward a central axis 50 of the loop 40. The pleated loop also includes a series of outward pleats, 52, 54, 56 and 58 for example, which are in an alternating relationship with the inward pleats. As will be noted, alternating inward pleats and outward pleats share common sidewalls; hence, it is to be understood that in the context of this disclosure, an outward pleat is a pleat having a pair of sidewalls meeting at an apex on crest directed away from the central axis of the loop, and an inward pleat is defined by a pair of sidewalls meeting at an apex or crest which is directed toward the central axis.

The pleating process may be advantageously carried out quite simply by a mechanical jig. For example, a jig may be configured to have a series of movable pins corresponding in number to the desired number of inward and outward pleats. These pins may be disposed about the loop in two groups, a first surrounding the outside of the loop and a second surrounding the inside of the loop. In order to make the pleats, the outer group of pins is moved inward toward the central axis 50 and in so doing form the inward pleats. The group of pins on the inside of the loop are displaceable toward the central axis, but they are preferably spring loaded to provide a resistance to motion. When the first group of pins is moved inwardly, the second group also travels inward to some degree, but to a lesser degree than the first group of pins, and in so doing they form the outward pleats. Clearly, other mechanical arrangements may be similarly implemented.

It is to be appreciated that the present invention does not require that the loop be formed prior to the pleating. In some instances, it may be expedient to pleat a strip of material and subsequently assemble it into a loop to form a structure generally similar to that of FIG. 4. Such embodiments are also within the scope of this disclosure and the invention.

Figure 5:
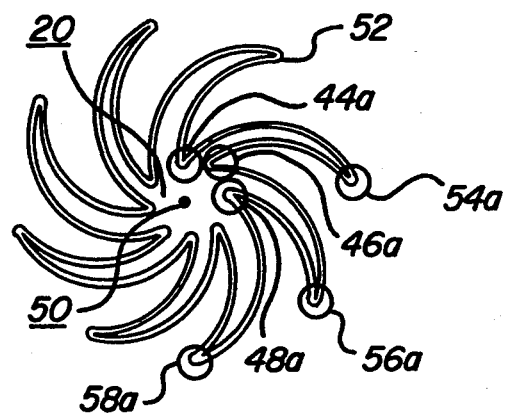
FIG. 5 is a top plan view of a pleated, spirally wrapped loop of material at a further stage in its processing.
Figure 6:
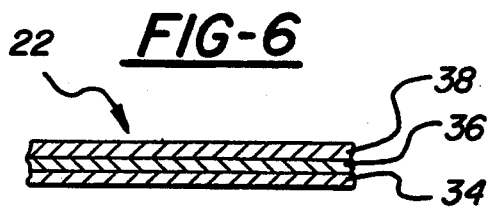
FIG. 6 is a cross sectional view of a multi-layered body of filter material.
Figure 7:
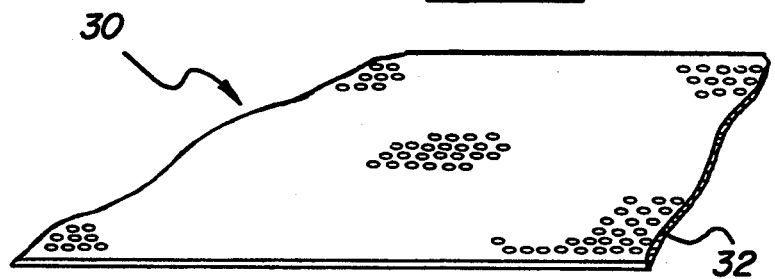
FIG. 7 is a perspective view of an extruded spacer material.

In the next processing step, as illustrated in FIG. 5, the pleated loop 40 is spirally wound. The winding process is carried out by wrapping the pleats, about the central axis 50. The wrapping process compresses the loop so as to provide a cylindrical filter element, for example, as illustrated at reference numeral 12 in FIG. 1. The wrapping process brings the inward pleats into a configuration wherein the apices or crests thereof, for example, 44a, 46a and 48a, are disposed in an abutting relationship about the central axis 50 so as to form a column which defines the central passageway 20 of the filter element. In the final configuration, the outward pleats are disposed with their apices, for example 54a, 56a, 58a, generally tangent to the surface of the cylindrical filter element.

It will be understood from reference to FIG. 5 that a fluid introduced into the central passageway 20 of the filter element will pass in a generally perpendicular direction through the various layers of the loop 40. Similarly, a fluid introduced exteriorly of the filter medium will pass in the reverse direction through to the central passageway 20. Thus, it will be appreciated that the structure of the present invention provides a single pass filter wherein flow is generally perpendicular to the filter medium. The configuration of the present invention provides a large area of filter material packaged in a relatively small volume. Most importantly, the pleated structure is quite strong because each pleat cross section becomes a significant mechanical column resistant to both compressive and torsional distortion. Additionally, each pleat closely abuts adjacent pleats in such a way that the entire pleat pack formation becomes a strong and rigid structure capable of withstanding typical mechanical pressures associated with dead-end filtration, without suffering significant distortion.

The lack of the central core greatly simplifies the manufacture of the filter since the steps of attaching a core and affixing the core to the fluid inlets need not be implemented. Also, the coreless structure provides less impediment to fluid flow and hence smaller pressure drops across the filter. The filter structure of the present invention may be manufactured in a variety of configurations, although it is most preferred that it be employed with filters having an active filter medium area of no more than 1,000 square cm, said term being defined as the surface area of the filter medium available for fluid flow therethrough. One particularly preferred filter includes an active area of approximately 250 square cm, and it has been found that this filter can readily withstand a pressure of 40 psi without distortion.

To some degree the strength of the filter element will depend upon the aspect ratio of the filter element, such term being understood to mean the ratio of the height to the diameter of the cylindrical element. A filter element having a very high aspect ratio, i.e., a very tall narrow cylinder, will not be very resistant to loading either in a direction perpendicular to the axis of the cylinder or in a radial direction; hence, a filter of this type would not be very durable and could not sustain a large pressure drop thereacross. A filter element having a very low aspect ratio, i.e., a very short and wide filter element, would exhibit very high strength in both directions, but it would be difficult to fabricate and would consume relatively large amounts of material. It is generally preferred that the filter medium have an aspect ratio in the range of 0.25 to 5; although it is to be understood that for relatively large area filters, i.e., filters with an active medium area greater than 500 square cm., greater aspect ratios may be employed while retaining sufficient strength.

Figure 8:
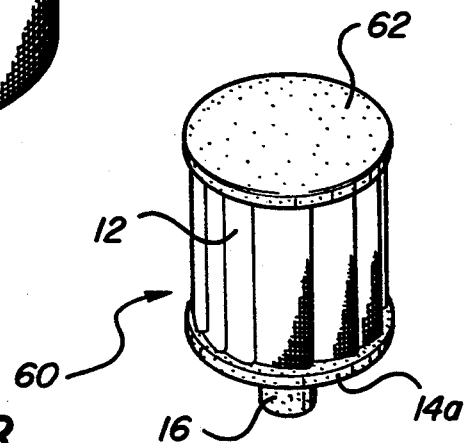
FIG. 8 is a perspective view of another embodiment of filter structured in accord with the present invention.

While FIG. 1 illustrates one particular embodiment of filter wherein the filter medium is completely enclosed in a housing, it is to be understood that other configurations are also within the scope of the present invention. For example, FIG. 8 depicts a filter 60 which includes an open housing structure. The filter 60 of FIG. 8 includes a filter element 12 as previously described. Affixed to one end of the filter element 12 is an end cap 14a generally similar to that of FIG. 1. The end cap 14a includes a conduit 16 disposed to communicate with the central passageway (not shown) of the element 12. The remainder of the housing comprises a top cap 62 disposed to seal the other end of the cylindrical filter element 12. In the FIG. 8 embodiment, the remainder of the housing is cut away so as to expose the outer perimeter of the element 12. In this embodiment, the cutaway portion of the housing comprises the second conduit. This filter is of particular advantage in applications wherein the entire filter is immersed in the fluid to be filtered. For example, filter 60 of FIG. 8 may be used to provide filtered air for a particular application by disposing the filter in the ambient atmosphere and drawing purified air out through the conduit 16. Similarly, the filter may be immersed in a liquid and filtered liquid drawn from the conduit 16. Clearly, other configurations are also within the scope of the present invention. In view of the foregoing it will be understood that the drawings, discussion and description herein is meant to illustrate, but not limit, the scope of the present invention. It is the following claims, including all equivalents, which define the scope of the invention.

We claim:

1. A coreless filter consisting of:
   I. a cylindrical filter element consisting of:
      (a) a first elongated strip of a first support material having the ends thereof joined together to form a first support loop;
      (b) a second elongated strip of a second support material having the ends thereof joined together to form a second support loop, said first and second support loops being disposed in a generally concentric relationship;
      (c) an elongated strip of a filter material having the ends thereof joined together to form a filter loop, said filter loop being concentric with, and interposed between, said first and second support loops;
   said filter element being configured as a pleated, spirally wound, cylindrical body which consists of plurality of inward pleats and a plurality of outward pleats in an alternating relationship therewith, said inward pleats being directed toward a central axis of the cylindrical filter element and having apices which are disposed in an abutting relationship so as to form a column which defines a central passageway through the filter element, said outward pleats being wrapped about said central axis so that apices of said outward pleats are tangentially disposed upon an exterior surface of said cylindrical filter element;
   II. a filter housing enclosing said filter element and including a first fluid flow conduit in communication with the central passageway and a second fluid flow conduit in communication with the exterior surface of said cylindrical filter element, so that a fluid introduced into one of said first and second conduits passes through said first support material, said filter material and said second support material and exits through the other of said first and second conduits.

2. A filter as in claim 1, wherein said filter material consists of a microporous membrane.

3. A filter as in claim 2, wherein said microporous membrane is a hydrophilic microporous membrane.

4. A filter as in claim 2, wherein said microporous membrane has a pore size in the range of 0.1–0.5 microns.

5. A filter as in claim 2, wherein said microporous membrane is prepared from a material selected from the group consisting of: polyethersulfone, polysulfone, polytetrafluoroethylene, polypropylene, and combinations thereof.

6. A filter as in claim 1, wherein the filter material consists of a plurality of layers of microporous material disposed in a superposed relationship.

7. A filter as in claim 1, wherein said first support material and said second support material are selected from the group consisting of: woven materials, non-woven textiles, paper, non-woven polymeric mesh, and combinations thereof.

8. A filter as in claim 1, wherein said first support material and said second support material are prepared from a material selected from the group consisting of: nylon, polyester, polypropylene, and combinations thereof.

9. A filter as in claim 1, wherein the active area of said filter loop is no greater than 1,000 square cm.

10. A filter as in claim 9, wherein the active area of said filter loop is approximately 250 square cm.

11. A method for the manufacture of a coreless filter, said method consisting of the steps of:
   providing a first and a second elongated strip of a support material;
   interposing an elongated strip of filter material between said first and said second strips of support material;
   joining the ends of said elongated strips so as to form a cylindrical loop;
   forming a plurality of inward pleats in the loop, said inward pleats each having an apex directed toward the central axis of the loop;
   forming a plurality of outward pleats in the loop, said outward pleats each having an apex directed away from the center of said loop, said inward and outward pleats being in an alternating relationship;
   wrapping the outward pleats about a central axis of the loop so as to form a cylindrical filter element in which the apices of the inwardly directed loops are disposed in an abutting relationship so as to form a column which defines a central passageway through said cylindrical element, and the apex of each outward loop is tangentially disposed upon an exterior surface of said cylindrical filter element;
   disposing said filter element in a filter housing, said filter housing including a first fluid flow conduit in communication with the central passageway of said filter element and a second fluid flow conduit in communication with the exterior surface of the cylindrical element.

12. A method as in claim 11, wherein the step of interposing a filter material consists of interposing a microporous membrane.

13. A method as in claim 12, wherein the step of interposing said microporous membrane consists of interposing a hydrophilic microporous membrane.

14. A method as in claim 12, wherein the step of interposing said microporous membrane consists of interposing a microporous membrane having a pore size in the range of 0.1–0.5 microns.

15. A filter as in claim 12, wherein the step of interposing said microporous membrane consists of interposing a membrane prepared from a material selected from the group consisting of: polyethersulfone, polysulfone, polytetrafluorethylene, polypropylene, and combinations thereof.

16. A method as in claim 11, wherein the step of interposing a filter material consists of interposing a filter material including a plurality of layers of microporous material disposed in a superposed relationship.

17. A method as in claim 11, wherein the step of providing an elongated strip of said first support material and said second support material consists of providing a material selected from the group consisting of: woven materials, non-woven textiles, paper, non-woven polymeric mesh, and combinations thereof.

18. A method as in claim 11, wherein the step of providing an elongated strip of said first support material and said second support material consists of providing a strip prepared from a material selected from the group consisting of: nylon, polyester, polypropylene, and combinations thereof.

19. A method as in claim 11, wherein the step of interposing an elongated strip of filter material consists of interposing a strip having an active area which is no greater than 1,000 square cm.

20. A method as in claim 11, wherein the step of interposing an elongated strip of filter material consists of interposing a strip having an active area which is approximately 250 square cm.

* * * * *